United States Patent [19]

Johnannesson

[11] 3,781,477

[45] Dec. 25, 1973

[54] PICTURE TELEPHONE SYSTEM AT WHICH THE VIDEO SIGNAL IS ADAPTED TO THE CHARACTER OF THE PICTURE

[75] Inventor: Nils Olof Johnannesson, Bandhagen, Sweden

[73] Assignee: Telefonaktiebolaget L M Ericsson, Stockholm, Sweden

[22] Filed: May 17, 1971

[21] Appl. No.: 144,162

Related U.S. Application Data

[63] Continuation-in-part of Ser. No. 858,397, Sept. 16, 1969, abandoned.

[30] Foreign Application Priority Data

Oct. 8, 1968 Sweden ............................ 13536/68

[52] U.S. Cl. .......... 179/2 TV, 178/6.8, 178/DIG. 13

[51] Int. Cl. .......................................... H04m 11/00

[58] Field of Search ................................. 179/2 TV; 178/DIG. 3, 6.8, DIG. 13

[56] References Cited

UNITED STATES PATENTS

| | | | |
|---|---|---|---|
| 3,573,377 | 4/1971 | Anderson | 179/2 TV |
| 3,384,709 | 5/1968 | Quinlan | 179/2 TV |
| 2,102,139 | 12/1937 | Vance | 178/DIG. 3 |
| 3,401,299 | 9/1968 | Crowell | 178/DIG. 3 |
| 3,632,867 | 1/1972 | Markow | 178/DIG. 3 |
| 3,530,251 | 9/1970 | Miyawaki | 179/2 TV |
| 3,335,226 | 8/1967 | Michael | 179/2 DP |

OTHER PUBLICATIONS

Some Possibilities For the Compression of Television Signals, Recoding Proceedings of IEE July 1952

*Primary Examiner*—William C. Cooper
*Assistant Examiner*—Thomas D'Amico
*Attorney*—Hane, Baxley & Spiecens

[57] ABSTRACT

In a picture telephone system means are included at both ends of a telephone connection between two subscribers for adjusting the frame rate of pictures so that with a limited channel band width good resolution is obtained both for stationary detailed pictures such as documents and for moving pictures requiring less resolution such as conversing subscribers.

3 Claims, 1 Drawing Figure

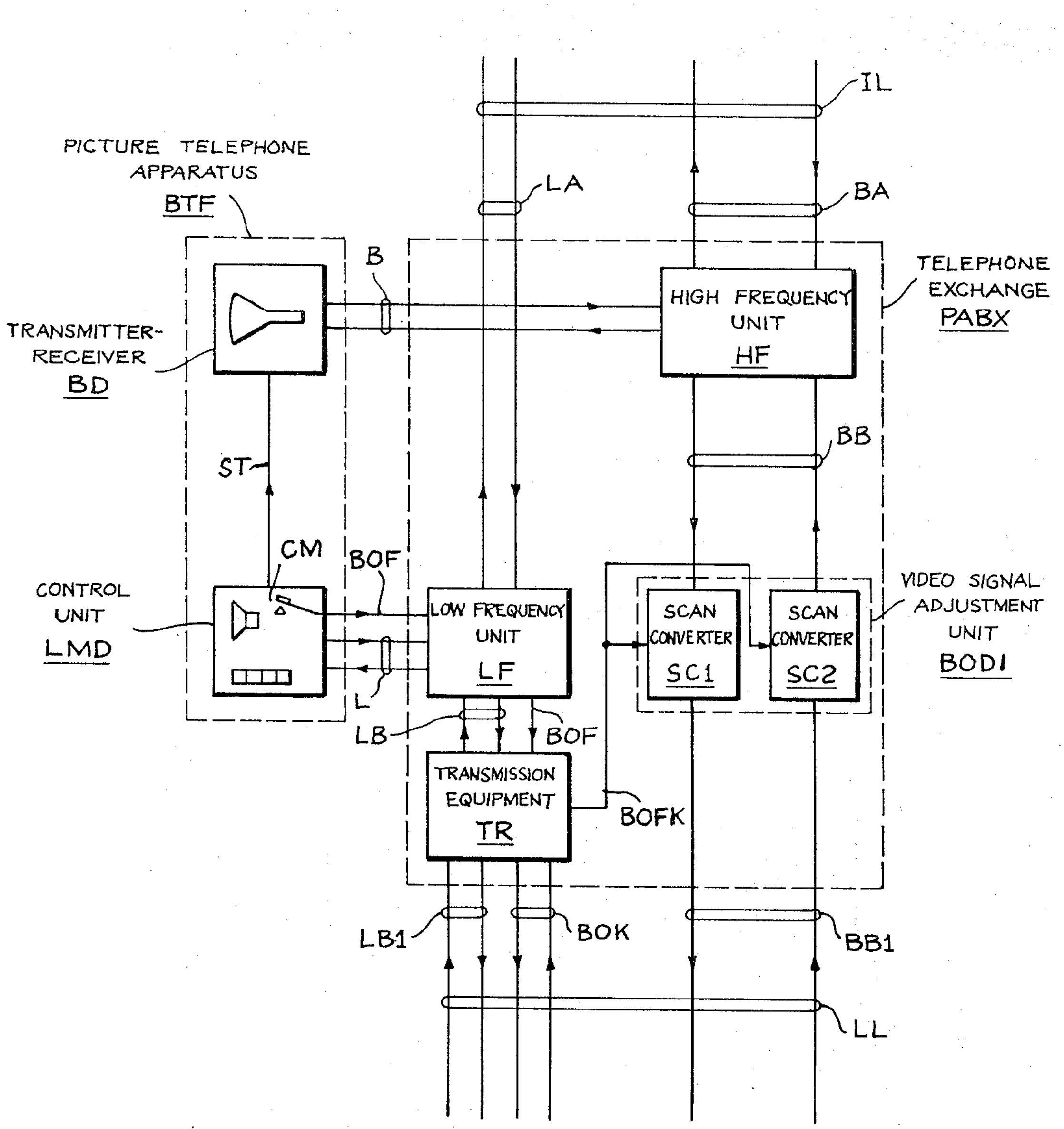
INVENTOR.
NILS OLOF JOHANNESSON
BY Hane, Baxley and Spiecens
ATTORNEYS

PICTURE TELEPHONE SYSTEM AT WHICH THE VIDEO SIGNAL IS ADAPTED TO THE CHARACTER OF THE PICTURE

This application is a continuation-in-part application of my co-pending U.S. Pat. application Ser. No. 858,397, filed Sept. 16, 1969, now abandoned.

The present invention refers to a picture telephone system comprising a number of picture telephone apparatuses each having a picture transmitting and receiving part and a voice transmitting and receiving part and in which picture telephone system the video signal can be adapted to the type of the picture to be transmitted, i.e., an object carrying out fast movements and not necessitating a great degree of sharpness, for example a face, or an object necessitating sharpness but which is not moving, for example a page of a text. By a picture telephone system is meant a telecommunication system in which television type pictures are transmitted between two telephone subscribers over telephone networks simultaneously with a voice telephone conversation.

In a picture telephone system of the above mentioned type it is necessary for economic reasons to transmit the video signal within a band width which is essentially narrower than the band width utilized in, for example, conventional television links. The narrow band width requirement is associated with principally long-distance connections while for local connections a relatively wide band width can be accepted. In order to reduce the band width on long distance connections there is the possibility of either reducing the resolution of details or reducing the picture or picture repetition rate. When the resolution is reduced the pictures with great detail such as text material can become indistinct because of loss of detail. When the picture rate is slowed down the picture quality of moving scenes such as lip movements is degraded because such movements become blurred.

It is an object of the present invention to provide a narrow band picture telephone transmission system which has, as required, good resolution of details and distinct pictures of moving scenes.

Other objects, features and advantages of the invention will be apparent from the following detailed description of the invention when read with the accompanying drawing, whose sole FIGURE shows in block and schematic form exemplary apparatus for practicing the invention.

In the drawing, BTF denotes a picture telephone apparatus having a picture transmitter-receiver BD, and a control unit LMD comprising voice transmitting and receiving means and controlling means for adjusting the picture, via line ST, as generally known in picture telephone apparatuses; see for example: Picture-phone Service at the New York Wold's Fair, 1964, described in Bell Laboratories Record, Vol. 47, No. 5, pp 160–161 (The Evolution of Picturephone Service) May–June 1969. Control unit LMD is provided with a further control means CM for changing the picture processing mode in video signal adjustment unit BOD1 according to the invention, as will be described below.

The picture telephone apparatus BTF is connected via a telephone exchange PABX to local subscribers and long distance subscribers. In particular, video or picture signal lines B connect the picture transmitter-receiver BD to exchange PABX while audio or voice signal lines L and control lines BOF connect the control unit LMD of the picture telephone apparatus BTF to the exchange PABX. Local subscribers (not shown) are connected to the exchange PABX via the lines LL comprising video signal lines BA and audio signal lines LA. Long distance subscribers (not shown) are connected to the exchange PABX via the lines IL comprising video signal lines BB1, audio signal lines LB1, and control lines BOK.

The telephone exchange PABX comprises: high frequency unit HF which is primarily a network which permits video signals on the incoming line of the line pair B from the picture telephone apparatus BTF to be fed to the outgoing lines of the line pairs BA and BB, and which permits video signals received from the incoming lines of either of the line pairs BA and BB to be fed to the outgoing line of line pair B; a low frequency unit LF which is similar to high frequency unit HF except that it handles audio signals and also includes a connection between control signal line BOF from the control unit LMD and the control line BOF to transission equipment TR; a transmission equipment TR which includes conventional relaying means for establishing connections between telephone exchange PABX and the long distance lines IL, and which includes means for transmitting a control signal on line BOFK when a signal is received either from the incoming line of control line pair BOK or from the line BOF; and the video signal adjustment unit BOD1 which connects lines BB to lines BB1 and controls the scanning format under control of a signal on line BOFK.

Since all the units of the telephone exchange PABX are well known and conventional in telecommunications systems except video signal adjustment unit BOD1 only this latter unit will be further described.

The unit BOD1 can include any known arrangement for converting television signals, for example scan converters or analog-digital converters. A scan converter is an arrangement consisting of a picture tube and a camera in series for permitting the changing of the scanning time of the picture tube. Such a scan converter is described in, for example, the reference "Fernsehtechnik," Band 2, Schröter, Springer Verlag 1963, Pages 506–511, and the reference "Die Entwicklung der deutschen Normwandlertechnik," Bödecker, Rundfunktechnische Mitteilunger, 1958, Nr. 5. In the present embodiment it is assumed that the unit BOD1 consists of scan converters SC1 and SC2 each having two scanning velocities, a normal velocity for transmitting, for example, a picture of a face and a lower velocity for transmitting a text. It is also assumed that the scan converter when not receiving any control signal on line BOFK operates at the normal scanning velocity while when receiving a control signal operates the lower scanning velocity. The video signal adjustment unit BOD1 includes the scan converter SC1 for the outgoing video signals and the scan converter SC2 for the incoming video signals. With each of the long distance lines there is associated a video signal adjustment unit BOD1.

During normal operation, i.e., for example in face-to-face conversation, no signal is present on line BOFK and the scan converters SC1 and SC2 operate at normal scanning velocity and the video signals pass between the high frequency unit HF and the lines IL. However, for text transmission from unit BD to another subscriber connected via one of the lines IL there is a signal on line BOFK causing the scan converter SC1 on the transmitting side and the corresponding converter SC2 on the receiver side (not shown) to operate at lower scanning velocity which enhances detail but slows down the frame rate. Now the text transmission mode can be initiated by either the calling subscriber or the called subscriber which have identical picture telephone apparatuses.

Assuming the calling subscriber has the apparatus BTF shown in the sole FIGURE, and wishes to transmit a written text then he moves a switch in control unit CM to a position for causing the generation of a control signal on line BOF which passes via low frequency unit LF and line BOF to transmission equipment TR. Transmission equipment TR transmits a control signal on line BOFK to the scan converter SC1 to set up the slow scanning velocity in the calling subscriber's exchange PABX. At the same time, transmission equipment TR transmits a control signal on the outgoing line of the pair BOK to the similar exchange of the long distance called subscriber connected to long distance lines IL which sets the scan converter SC2 therein to the slow scanning velocity. If the called subscriber has the picture telephone apparatus BTF and is connected to the telephone exchange PABX of the sole FIGURE, then when the calling subscriber operates the switch in his corresponding control unit CM, the corresponding transmission equipment TR of the calling subscriber's exchange would transmit a control signal on a line of the pair BOK which is received by the transmission equipment TR. Transmission equipment TR generates a control signal on line BOFK causing the scan converter SC2 to operate at the slow scanning rate.

Now, several variations are possible. One could place a unit BOD1 in each picture telephone apparatus. However, with the present cost of scan converters such an approach is not economically practical. Therefore, it is more desirable to place the units BOD1 in the exchanges which are connected by long distance lines.

The invention is, of course, also applicable when other known types of video-signal conversion arrangements are used, for instance when the narrow-band-transmission utilizes analog-digital and digital-analog conversion in a digital system, such as a PCM-system known in the art. In such a case, scan converter SC1 is preferably replaced by an analog-to-digital encoder; scan converter SC2 is replaced by a digital-to-analog decoder with both having the facility of two modes of operation, but at the same clock frequency. In one mode, face-to-face, the sampling intervals are longer, and the number of bits per interval greater, resulting in a picture with good gray tones but limited resolution. In the other mode (graphics and text) only a two-bit code is used, but the sampling intervals are shorter, resulting in a black-and-white picture only, but with higher resolution.

I claim:

1. In a picture telephone system having a plurality of picture telephone apparatuses each having a picture transmitting and receiving part and a voice transmitting and receiving part, and interconnected telephone exchanges having switching means for connecting the picture transmitting-receiving part of a calling subscriber to the corresponding part of a called subscriber via a video signal line and switching means for connecting the voice transmitting and receiving part of a calling subscriber to the corresponding part of a called subscriber through a voice signal line, apparatus for controlling the frame rate of video transmission between a calling subscriber and a called subscriber comprising at least two video signal adjustment means, one associated with the calling subscriber, the other associated with the called subscriber, each of said video signal adjustment means including first frame rate adjusting means for adjusting the frame rate of the picture to be transmitted and second frame rate adjusting means for adjusting the frame rate of the picture to be received, each of the picture telephone apparatuses including means for generating a first control signal for indicating the frame rate desired by the subscriber, at least two transmission equipment means, one associated with the calling subscriber, the other associated with the called subscriber, each of said transmission equipment means including control means for controlling the frame rate adjusting means of its associated video signal adjustment means and including transmitting means for transmitting a second control signal to the other transmission equipment means, the control means and transmitting means of each of said transmitting equipment means operating in response to either a first control signal from the associated picture telephone apparatus or a second control signal from the other transmitting equipment means whereby either the calling or the called subscriber can select the frame rate for the video communication between the subscribers.

2. The apparatus of claim 1 wherein said frame rate adjusting means are scan converters.

3. The system of claim 1 wherein said video signal adjustment means are in the telephone exchanges.

* * * * *